3,501,122
REAR VIEW MIRROR CONSTRUCTION
James M. Barker, Battle Creek, Mich., assignor, by mesne assignments, to S. H. Leggitt Company, Inc., Marshall, Mich., a corporation of Michigan
Filed May 8, 1967, Ser. No. 636,937
Int. Cl. A47g 1/24
U.S. Cl. 248—486                                    4 Claims

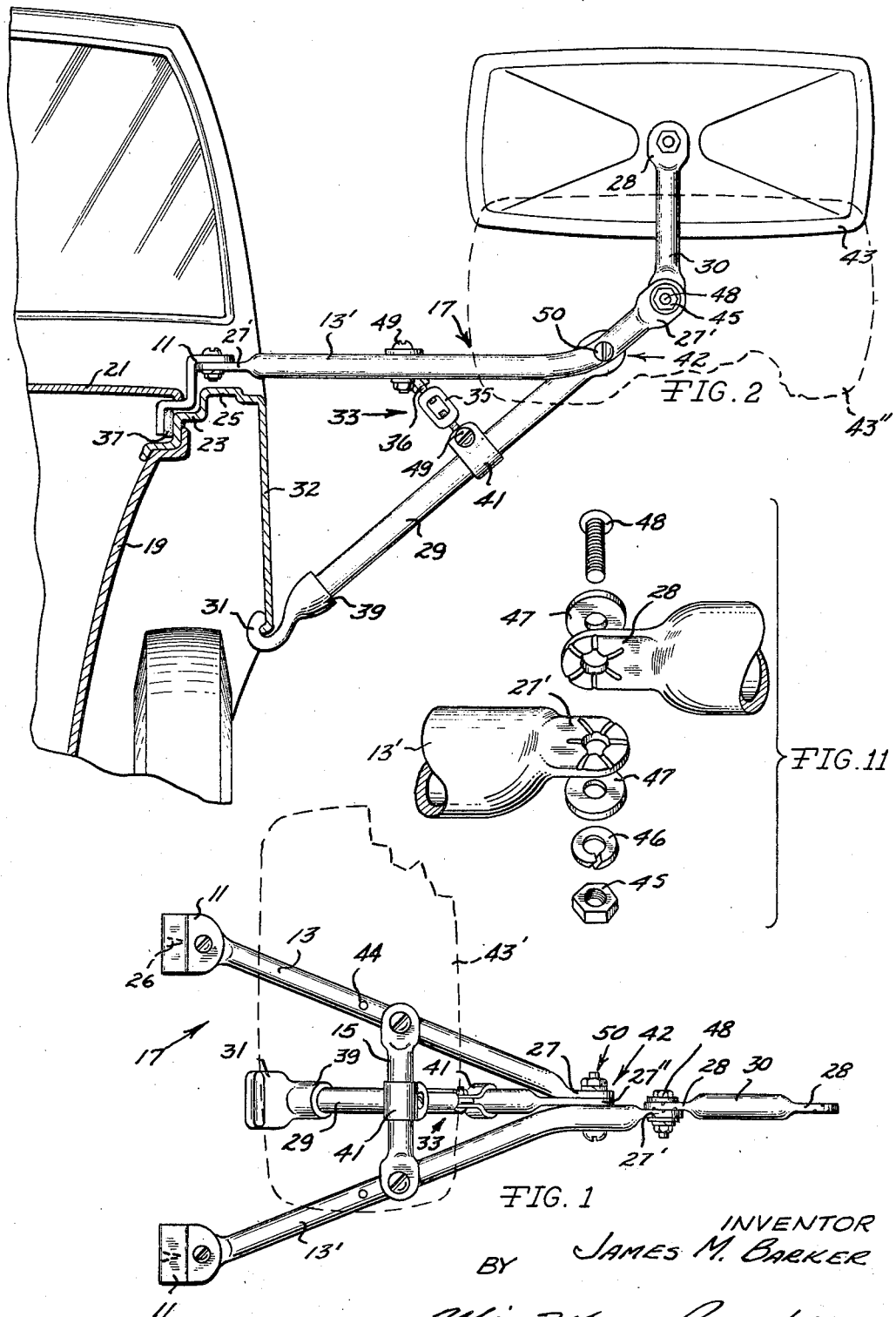

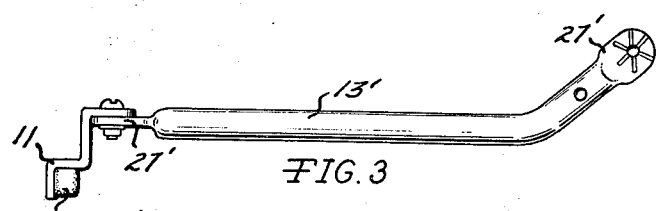
FIG. 3
FIG. 4
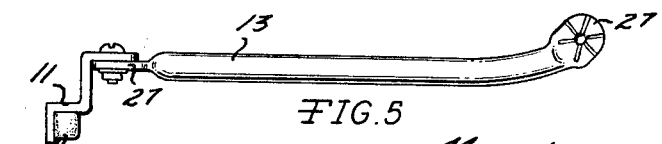
FIG. 5
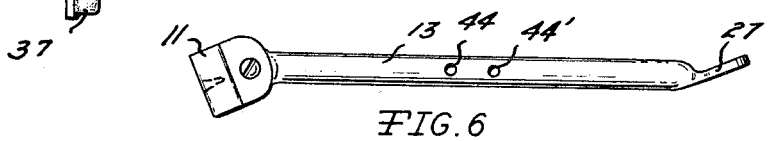
FIG. 6
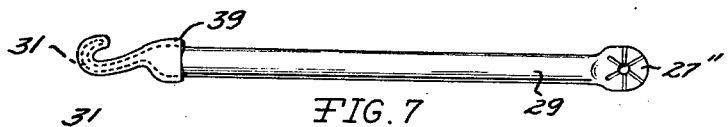
FIG. 7
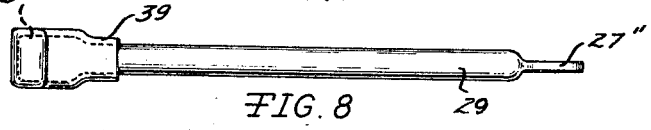
FIG. 8
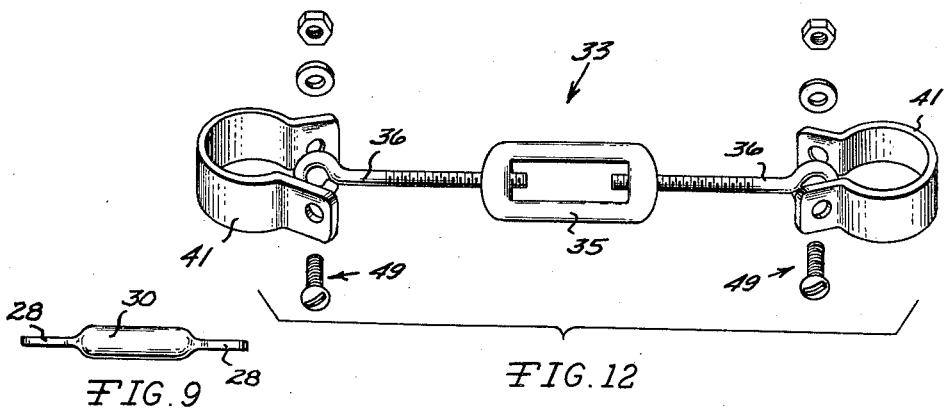
FIG. 12
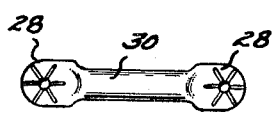
FIG. 9
FIG. 10
INVENTOR
JAMES M. BARKER
BY
ATTORNEYS

United States Patent Office 3,501,122
Patented Mar. 17, 1970

ABSTRACT OF THE DISCLOSURE

An automotive rearview mirror construction with a three-legged support arm for tripodal connection to the exterior of an automotive body, wherein one of the upper of the arms includes a bend beyond the apex of the tripod, a mirror mounted on the bent leg outboard of the apex of the tripod, and tensioning means applied to draw the legs together for gripping of the automotive frame between the feet of the tripod and in which two of the three legs are positionally securable to the vehicle.

SUMMARY OF THE INVENTION

The present invention relates to automotive rear view mirrors, and particularly to such mirrors having three-legged or tripodal support booms mounted to grip the exterior of an automotive body, especially the front fender structure thereof.

In tripodally supported outrigger mirrors of the type best appreciated by reference to the disclosure of United States Letters Patent No. 3,259,349 to Lee, an automobile body is gripped between the feet of the three legs of an outrigger construction. The persistent problem in this type of construction is the maintenance of a rigid and tight connection of the outrigger arm to the vehicle body. The outrigger frame is subject to loosening or rattling due to the continuous and often severe vibration or other disturbances from the motion of the vehicle, particularly when traveling on unimproved roads. The three legs of the outrigger structure are connected at a single point to form an apex. This prior art arrangement results in a sliding fulcrum. The two upper members have previously been joined to the diagonal strut member by a slidable collar which encircles the tubular strut and is clamped thereto. This clamp was difficult to keep tightened and would loosen under vibration and experience some slipping up or down on the diagonal strut member. The present invention eliminates the tubular collar clamp on the strut and instead connects all three members of the outrigger at the apex thereof by a single pin which goes through all three leg elements of the tripodal construction to provide a fixed apex. Thus slippage, at the apex, among the members joined thereat, is precluded.

The resulting "goose neck" or bend at and extending upwardly and outwardly from the apex connection on the bent leg of the A-frame also results in providing an alternate connection so that the mirror may be affixed to the end of the bent leg and in many instances the extension is made unnecessary. In contrast to prior art devices, this arrangement, with or without extension, lowers the elevation setting of the mirror in avoidance of a "blind spot" behind the mirror. In brief, the driver in use of the present mirror device looks more downwardly than outwardly and his forward vision is then less obscured.

Another problem that recurs in this type of outrigger mirror construction is the effect of the downward component of force absorbed by the lower leg or strut which hooks under the auto fender well. This force results from the weight of the outrigger structure and the mirror proper. Such force tends to slide the foot of the diagonal strut downward, and the bottom hook thereof disengages from the fender. The three way gripping action is then lost and the entire outboard structure is no longer satisfactorily attached to the vehicle body. Upon this loss of gripping action the mirror may vibrate completely off the vehicle or flutter with such force as to bend or otherwise become damaged. There is also the attendant possibility of injury to persons or other vehicles.

The brackets in the present device are made repetitively locatable in reference to the fender so that mounting and dismounting adjustment problems are minimized and the legs are positively located.

The structure of the present invention is made so that collapse of the structure and simple relocated attachment of the mirror to a horizontal A-frame allows the mirror unit to be shipped fully assembled so that the ultimate user does not have to assemble the device, and can store it safely in its flat pack shipping carton when not in use.

In the present invention, the strut member terminates at the apex of the tripod construction. An extension therefrom for mirror attachment is provided by a continuation of one of the upper arms of the tripodal frame. Preferably, the frontmost member thereof is bent to extend beyond its apex connection in an upward bend which terminates in a pinched or flattened end tab for connection to a mirror supporting link arm. The result is a redistribution of the compression forces deriving from the weight of cantilevered boom and mirror, with a consequent diminution of the downward stress in the lower leg or strut. The ultimate result is a minimization of the downward push on the hook of the diagonal strut, and its tendency to disengage from the vehicle fender is greatly reduced.

Accordingly, it is an object of this invention to provide an improved tripodal mirror frame for automotive vehicles, with a more positive gripping action on the vehicle body, and less tendency to loosen or become unsecured at its outboard apex jointure of leg members.

It is another object of this invention to provide a mirror frame construction less likely than previous mirrors to become vibrationally disengaged from the vehicle body to which it is attached.

Still another object of this invention is the provision of an outboard automotive mirror construction which is less expensive and simpler in construction than those of the prior art.

Other objects will become apparent to those skilled in the art upon examination of the following disclosure, drawings and claims.

IN THE DRAWINGS

FIGURE 1 is a top plan view of the mirror construction of the present invention showing the upper A-frame portion thereof and the step brackets for gripping against the engine compartment portion of the fender well of an automotive vehicle; and showing also one arm of the A-frame portion as bent into planar relationship with the adjoining faces of the remaining two legs at the apex of the tripod formed by the three legs. FIGURE 1 also shows, in broken line, an alternate mirror attachment for flat packing of the entire construction, to facilitate storing and/or shipping.

FIGURE 2 is a front elevation view of the mirror construction of the present invention in gripping three point attachment to the front fender of an automobile.

FIGURE 3 is a front elevational view of the foremost arm of the divergent pair which form the upper A-frame portion of the mirror construction of the present invention, and shows the upward angle of the outboard portion of the front arm of the A-frame structure.

FIGURE 4 shows a top plan view of the foremost A-frame arm of the present invention, showing the third dimension to the bend therein which provides for planar connection to the outboard ends of the two other members of the mirror frame tripod.

FIGURE 5 is a front elevational view of the rearmost arm of the A-frame structure of the outrigger mirror boom of the present invention.

FIGURE 6 is a top plan view of the foremost A-frame arm shown in FIGURE 5.

FIGURE 7 is a front elevational view of the diagonal strut or lower leg of the tripodal structure of the present invention, shown in a horizontal orientation.

FIGURE 8 is a top plan view of the diagonal strut shown in FIGURE 7.

FIGURE 9 is a top plan view of a mirror connecting link arm, rotated into a horizontal orientation.

FIGURE 10 is a top plan view of the mirror link arm in the orientation shown in FIGURE 9.

FIGURE 11 is an exploded assembly view of the linkage structure connecting the mirror link arm to the end tab of the front arm of the outrigger boom structure of the present invention.

FIGURE 12 is an exploded view of the turnbuckle tensioning means for constricting the three legs of the tripodal outrigger boom, which grips them tightly about a vehicle fender structure.

DESCRIPTION OF A PREFERRED EMBODIMENT

This invention is presented as an improvement upon presently known mirror constructions of the type generally utilizing three legs for a boom or extension structure as seen in FIGURE 1. The three legs are of a strong tubular steel construction and connected together at their upper ends to form a tripod-like structure. The feet of the tripod are attached to the vehicle body as depicted in FIGURE 2. Such attachment may be accomplished in a variety of ways. My preferred embodiment uses stepped bracket elements 11 on the uppermost two legs 13 and 13' of the tripod. These two legs with their connecting cross arm 15 may be characterized as an A-frame 17 the feet of which are connected by the bracket elements 11 between the vehicle body 19 and engine hood 21. The stepped brackets 11 are drawn by tension means (to be described) outwardly against the hood closure step, or lip 23. The connecting elements, or stepped brackets 11 are formed so as to be secured flatly against the step 23 and protrude upwardly between the closed hood 21 and the upper fender surface 25. The brackets 11 are provided with inward extending nubbins 26 shown in broken line. When they are located into holes (not shown) drilled into the vertical, or rise portion of the hood closure step 23, they serve as positioners for the outrigging structure of the mirror. Thus, the mirror outrigging is not fastened to the fender structure and is therefore quickly and easily detachable therefrom. At the same time it may be easily reattached to the same position from which it was removed, by merely relocating the nubbins into the locator holes in the fender hood lip or step 23.

The upper step of the bracket 11 provides a substantially horizontal portion for planar engagement with flat end tab portions 27 and 27' on the ends of the A-frame arms 13 and 13' respectively. Similar end tabs 27" and 28 provide for flat, friction locked connections on the diagonal strut 29 and mirror link arm 30.

The extended A-frame arms 13 and 13' are connected by a tubular cross bar 15, which total combination may be characterized more generally as an A-frame 17. The A-frame 17 extends outwardly from the car to the vertex of the A where it is supported from below by a diagonal strut 29 which connects at its lower end to the automobile fender well 32.

A preferable means of this connection is like that shown in the prior art already referenced, namely a hooked connection where the lower end of the strut 29 is bent into a hooked configuration 31 which is tensioned to the edge of fender 32.

A tension member 33 is extended between the cross bar of the A-frame 17 and the diagonal strut 29. This member may preferably be a turnbuckle 35 which tightens the eye bolts 36 and draws the vertical strut 29 and A-frame 17 together to grip the fender tightly. Thus the outrigger construction is snubbed securely to the fender assembly. The feet of the A-frame 17 and the foot of the diagonal strut 29 are properly padded to avoid marring of the auto finish and to minimize vibrational effects. For example a polyurethane cushion 37 is shown (in FIGURES 2 and 3) on bracket 11. Strut hook 31 is similarly provided with a tough vinyl plastic sock 39.

The tensioning turnbuckle is attached at each end to the tubular framework by sliding clamps 41 which may be slid to a selected position both on cross member 15 of the A-frame 17, and on the diagonal strut 29. This gives additional adjustability to the entire outrigger structure. The collar clamps 41 are connected to the eye bolts 36 and also locked in their selected position by the clamp screws 40.

Attention is now directed to the foremost arm 13' of the two divergent members of the A-frame 17. This foremost member 13' may be seen in FIGURE 2 as extending beyond the apex 42 of the outrigging. Although connected rigidly to the remaining two members of the tripod, it proceeds in a plane parallel to the diagonal strut 29 as shown in FIGURE 1 and in an upward bend beyond its connection to the apex of the outrigging as shown in FIGURE 2. This angle arm 13' of the A-frame structure extends upward sufficiently far to provide a mounting station for a rear view mirror 43. The end tab 27' of the angle arm 13' is shown as coined for locking engagement with corresponding coining on end tab 28 of mirror link arm 30. Link arm 30 may be rotated to various angles to give the desired positioning of the mirror. Prior mirrors, of the present type of tripodal outrigging, used a sliding collar to join the A-frame arms to the strut member. The strut member was necessarily extended vertically to give sufficient length for upward adjustment of the collar when fitting the structure to specific fender configurations. This vertical height, although essential to the adjustability features of the construction, represented an undesirable block to driver vision in the forward direction. The mirror itself, in this elevated disposition, introduced a substantial "blind spot." By contrast the structure of the present invention omits the collar at the apex 42 of the tripod. The apex 42 is thus a pin joint and no excess vertical extension of the strut 29 need be introduced. The A-frame 17 is maintained in a substantially horizontal orientation and the arm 13' bends at the apex 42, only modestly upward. As a result, the entire apparatus is kept low to yield clear forward vision for the driver. To further minimize any "blind spot" the link arm 30 may be removed and the mirror 43 mounted directly to the outboard tab 27', as shown in alternate position 43".

Forging a three dimensional bend into the angle arm 13' gives a work hardened strength to the arm for improved resistance to the moment force from the weights of the cantilevered outrigging and mirror 43, under kinetic vibrations from the moving automotive vehicle. The upward curve also elevates the mirror position, enabling it to be manipulated without interference with the mirror boom structure and to be viewed more conveniently. FIGURE 4 discloses the third dimension to the outboard bend of the angle arm 13'. The curvature seen in this view is necessary to conform the angle arm 13' to the co-planar relation of the joining tabs 27" and 27 of the strut 29 and arm 13 respectively. The tabs 27 and 27" are then joined in a mutually flat face engagement with arm 13' to form the tripod apex 42, best appreciated by reference to FIGURE 1. The flat face engagement at the apex joint gives increased frictional resistance to loosening rotations of the joined members.

FIGURE 4 shows the location of cross arm connecting hole 44 in each A-frame arm, and alternate connecting hole 44', for the cross member 15 of the A-frame. The alternate cross bar locations result in an extended adjustability of the mirror boom structure.

FIGURE 5 shows the short arm 13 of the A-frame structure (isolated from the A-frame) connected at one end to an attachment bracket 11. The outboard end of the short arm 13 is curved slightly upwardly to follow the upward extension of the angle arm 13' as far as the midpoint thereof. This relationship registers the connecting hole of the short arm with the connecting hole at the midpoint of the angle arm extension. This relationship is seen in FIGURE 3.

FIGURE 6 shows a view of the short, or angle, arm 13 which is substantially equivalent to the longer portion of the angle arm of FIGURE 4. The end tab 27 is bent upward somewhat to merge into a co-planar relationship with the connecting tab 27" of the strut 29, as already appreciated in FIGURE 1.

The diagonal strut 29 has at one end a hook 31 covered with the finish protecting plastic sock 39 as seen in FIGURE 7.

An isolated view of the mirror link arm 30 is seen in FIGURES 9 and 10, its connecting end tabs 28 each coined for locking with corresponding coining on the end tab 27' of angle arm 13' and the connecting tab (not shown) of the mirror 43. The intertabular connection between the angle arm 13' and lower link arm tab 28 is shown in FIGURE 11 as secured by nut 45, lock washer 46, thrust washers 47, and bolt 48. The coining of the tabs 27' and 28 provides for secure locking of the link arm in a discrete number of various angles without slippage under the mirror weight or vehicle vibration.

The details of construction of the tensioning means 33 are best appreciated by reference to FIGURE 12 which shows the turnbuckle structure 35 which expands or retracts the eye bolts 36. The eye bolts connect to the A-frame cross bar 15 and diagonal strut 29 by the slidable circle clamps 41, whereby the turnbuckle may be diagonally adjusted along the strut 29 to a desired position and then secured by tightening the clamp 41 by the bolt assembly 49. Similarly, the opposite end of the turnbuckle may be adjusted transversely along the A-frame member 15. This adds still further variation to the configuration of automotive fender to which the unit may be adapted.

One aspect of the improvement of the present invention is the manner of connecting the three tripod legs at the apex thereof. The joint is connected by a pin member, most likely a bolt assembly 50 as shown in the preferred embodiment of FIGURE 1. A connecting pin or screw bolt passes through all three members and holds them fixed in an unmovable interrelationship. This is to be contrasted with apex connections of the prior art where the strut member was extended beyond the tripod apex, rather than one of the A-frame arms being so extended. In this prior art arrangement the diverging arms of the A-frame structure were each identical and terminated at the tripod apex 42. Connection of the A-frame to the extended strut was then accomplished by insertion of the strut member through a slidable tube clamp similar to the clamps 41 used on the turnbuckle of the present invention. The slidable collar required tightening to be secured in place, and the slidable collar was also subject to loosening under vibration. It is obvious that locomotion of the vehicle subjected the outrigger apparatus to severe vibrations, which were amplified by the canilevered weight of the boom and mirror. Consequently the collar structure was difficult to keep tightened.

Applicant's apparatus solved this persistent problem by a novel connection of the tripod members, namely the pin or screw fastening means already described. Such means is not subject to slipping of the A-frame members down the tubular strut 29 since the new pin type connection obviously yields no such degree of freedom to the boom structure; the slipping problem is eliminated, along with the now unnecessary collar structure.

It is also a purpose of the present invention to lessen the tendency of the lower or diagonal strut 29 to disengage from its hooked connection under the front fender well of the associated car or automobile vehicle. Such a tendency results from the downward or compression force in the strut 29, from the weight load of the outrigger and mirror. Stress analysis of the network shows the prior art arrangement (mirror attached to the extended strut) to yield a symmetric distribution of stresses on each side of the structure separated by a vertical plane through the strut 29 (which symmetry is best envisioned by reference to FIGURE 1). However when the mirror 43 is supported by the extended upper arm 13', this symmetry is destroyed and the vertical load of the mirror structure is transmitted to the vehicle body as a twisting moment, resulting from unequal vertical force components at the two body brackets 11. There is a tendency of various elements of the boom structure to "settle" or yield under prolonged tensive connection to the vehicle body, with the possibility of a radical adjustment in the loading of the boom elements, sometimes such as to reverse the stress direction in the strut member 29 (from tension to compression) under the weight of the mirror and boom. When this occurs the downpull on the strut 29 tends to disengage it from its hooked, gripping relation under the auto fender well, with the consequent dangers of a detached mirror, as already mentioned in the Summary of Invention, supra. Now the above described absorption of the asymmetrical introduced moment load, by the fender brackets 11, accomplishes some reduction in the tendency of the strut force to become negative, i.e. compressive. Consequently, the tendency of the strut 29 to slip off the fender is decreased and a safer, more positively gripping mirror construction is the improved result.

A further important innovation of the present structure is its ability to be completely collapsed into a flat shape for ease of packaging and storing. Collar 41 is merely loosened and the strut 29 folded into the plane of the A-frame 17. The mirror 43 may be alternately fastened to the alternate cross member holes 44' and the entire system occupies a depth of little more than two inches. To this advantage of compactness is added the desirable feature of being shippable while entirely assembled which is convenient both to the shipper and the purchaser, and minimizes the likelihood of lost parts. Moreover, the purchaser may choose not to use the apparatus for specified intervals, whereupon he may simply store it in the original flat package without disassembly.

From this description of an operative, preferred embodiment of my invention, others skilled in the art may perceive improvements, modifications an substitutions therefor, these being intended for inclusion within the scope of the present invention.

I claim:

1. In a mirror construction for mounting on a vehicle engageable with said vehicle at the point between the edges of the hood and front fender thereof and at the edge of the adjacent wheel opening therein, the combination comprising:

a frame including generally horizontal, divergent first and second leg members, said first leg member having first connectible means intermediate the length thereof, said second leg member having connectible means at a point spaced from the inboard end thereof, said frame being upwardly curved adjacent the outboard end thereof;

an upwardly and outwardly extendable strut having connectible means at the upper end thereof;

fastening means for releasably joining together said connectible means on said second leg member and said strut to said first connectible means on said first leg member at a location spaced from said vehicle, said fastening means being adjustable to allow said strut to pivot on said frame;

said first leg member having a curved portion intermediate the length thereof, said curved portion being located inboard of and adjacent said first connectible means, said outboard end of said first leg member being angled with respect to the inboard portion thereof, the outboard end of said first leg member extending away from said curved portion and said vehicle in substantially parallel relationship to the plane in which said strut is pivotable, said curved portion lying in a plane acutely angled to the plane of the portion of said frame inboard of said curved portion and to said plane in which said strut is pivotable, said outboard end also extending away from said curved portion at an angle upwardly from the plane of said inboard portion of said frame and outwardly of said vehicle, said outboard end substantially paralleling said strut when said strut is normally positioned on said vehicle, said outboard end of said one leg member extending upwardly and outwardly beyond said strut;

brackets on the ends of said first and second leg members adjacent said vehicle engageable between the hood and the front fender;

a cross member extending between said first and second leg members between said vehicle and said joined connection;

a mirror and means for fixing said mirror to the outboard end of said first leg member;

an upwardly opening hook affixed to the lower end of said strut for engaging the upper edge of the wheel opening of the vehicle fender;

tension means connected between said cross member and said strut at a point on the strut spaced below said joined connection for urging said hook toward said bracket.

2. The mirror construction defined in claim 1, wherein said outboard end of said first leg member includes second connectible means at the outermost end thereof and spaced along said first leg member from said first connectible means;

wherein said means for affixing said mirror to said outboard end of said first leg member includes a link arm having connectible means on at least one end thereof, said mirror being connected to the other end thereof; and including second fastening means spaced along said first leg member upwardly and outwardly from said strut for adjustably joining together said connectible means on said link arm and said second connectible means on said outboard end on said first leg member to permit an adjustment of the location of said mirror relative to said frame and said vehicle and independently of an adjustment of said strut with respect to said frame.

3. The mirror construction defined in claim 1, wherein said second leg member includes a curved portion intermediate the length thereof and spaced inboard of said connecting means thereon, said connecting means on said second leg member lying at the outer end thereof, said curved portion on said second leg member lying in a plane substantially at right angles to said plane of said inboard portion of said frame, being curved upwardly from said lest-mentioned plane and being located opposite said curved portion of said first leg member.

4. In a mirror construction for mounting on a vehicle, engageable with said vehicle at points between the edges of the hood and the front fender thereof and at the edge of the adjacent wheel opening therein, the combination comprising:

a frame including generally horizontal, divergent first and second leg members, said first leg member having first connectible means intermediate the length thereof, said second leg member having connectible means at a point spaced from the inboard end thereof;

an upwardly and outwardly extendable strut having connectible means at the upper end thereof;

first fastening means for adjustably joining together said connectible means on said second leg member and said strut to said first connectible means on said first leg member at a location spaced from said vehicle, said first fastening means including first pin means through said leg members and strut at said connectible means for allowing pivotal movement of said strut with respect to said leg members during installation on the vehicle, the outboard end of said first one of said leg members extending beyond said adjustably joined connection and outwardly from the vehicle;

brackets on the ends of said first and second leg members adjacent said vehicle engageable between the hood and the front fender and an upwardly opening hook affixed to the lower end of said strut for engaging a lower edge of the vehicle fender;

a cross member extending between said first and second leg members;

said outboard end of said first one of said leg members including second connectible means adjacent the outermost end thereof;

a link arm having connectible means on at least one end thereof and a mirror connectible to the other end thereof, said link arm being spaced from said strut;

second fastening means adjustably joining together said connectible means on said link arm and said second connectible means on said outboard end of said first one of said leg members for allowing pivotal adjustment thereon of said mirror and link as a unit relative to said frame and said vehicle and movement of said unit toward and away from said strut, said second fastening means including second pin means through said first one of said leg members and said link arm, said second pin means being displaced along said one leg member from said first pin means and said strut by a distance substantially less than the length of said leg members inboard of said strut;

tension means connected between said cross member and said strut at a point on said strut spaced below said joined connection of said first and second leg members and said strut for urging said hook toward said brackets;

whereby provision of spaced independently adjustable first and second fastening means on said first leg member enables positioning of said link arm with respect to said strut and frame independently of the positioning of said strut with respect to said frame and thereby enables changing of the location of said mirror without loosening of the grip of said strut and frame on the vehicle.

References Cited

UNITED STATES PATENTS

| | | | |
|---|---|---|---|
| 2,943,536 | 7/1960 | Stafford | 248—479 |
| 3,081,057 | 3/1963 | Farnsworth | 248—226 X |
| 3,114,530 | 12/1963 | Shilling | 248—226 |
| 3,259,349 | 7/1966 | Lee | 248—485 X |
| 3,372,897 | 3/1968 | Lee | 248—480 |

ROY D. FRAZIER, Primary Examiner

F. DOMOTOR, Assistant Examiner